United States Patent Office 3,531,944
Patented Oct. 6, 1970

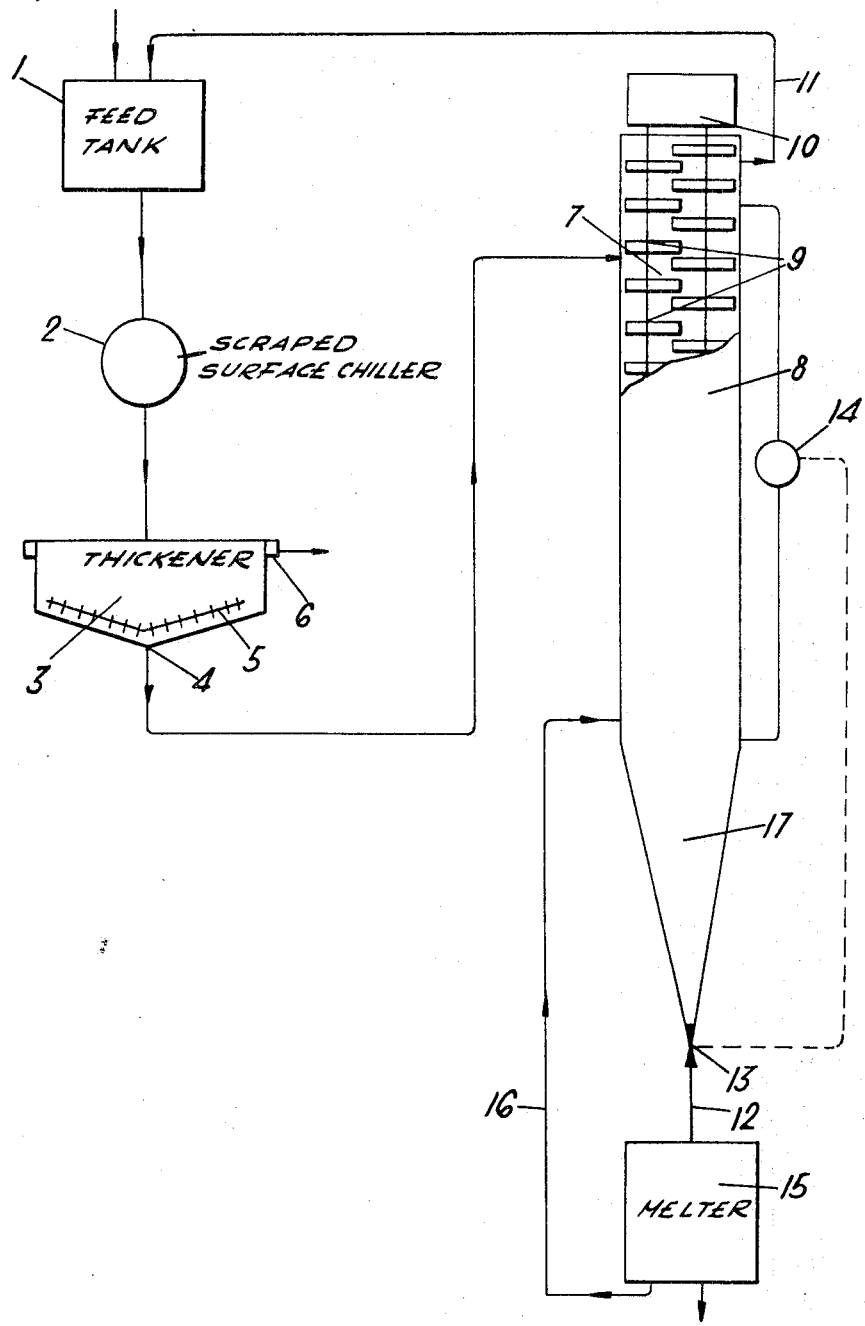

3,531,944
CRYSTALLISATION PROCESS
John Lindley, Norton-on-Tees, England, assignor to Imperial Chemical Industries Limited, London, England, a corporation of Great Britain
Filed Nov. 10, 1966, Ser. No. 593,529
Claims priority, application Great Britain, Nov. 15, 1965, 48,326/65
Int. Cl. B01d 9/04; C07c 15/08, 7/00
U.S. Cl. 62—58          6 Claims

ABSTRACT OF THE DISCLOSURE

A process for the separation from a liquid mixture of a component thereof which is crystallisable therefrom to produce crystals having a density greater than that of their mother liquor, which includes cooling the mixture to form a slurry of crystals of the component and mother liquor, feeding the crystals together with at least part of their mother liquor to a column feeding to a lower point in the column a wash liquid in which no substantial dissolution of crystals occurs, which liquid is miscible with the mother liquor and which either comprises a higher proportion of the component to be separated than does the mother liquor, or which consists of a material easily separable from the said component by distillation, flowing the wash liquid upwards, permitting the crystals to fall substantially freely in the column through the upwardly flowing wash liquid and removing crystals from the base of the column.

---

This invention relates to crystallisation processes.

According to the invention there is provided a process for the separation from a liquid mixture of component thereof which is crystallisable therefrom to produce crystals having a density greater than that of their mother liquor, which comprises cooling the mixture to form a slurry of crystals of the component and mother liquor, feeding the crystals together with at least part of their mother liquor to a column, and permitting the crystals to settle substantially freely in the column through an upwardly flowing stream of a wash liquid in which the crystals are substantially insoluble, which is miscible with the mother liquor and which either comprises higher proportion of the component to be separated than does the mother liquor, of which consists of a material easily separable from the said component by distillation, and removing crystals from the base of the column.

Preferably the density of the crystals is at least 10% and more preferably at least 15% greater than that of the mother liquor. It is also preferred that the crystals of the component to be separated should be of large average volume, for example $1 \times 10^{-6}$ cm.$^3$ and preferably at least $1 \times 10^{-5}$ cm.$^3$. Preferably also the crystal shape is such that on average the ratio of surface area to volume of the crystals is at most $r/3.95$ and preferably at most $r/3.75$ when $r$ is the radius of a sphere having a volume equal to that of the average crystal. Preferably also the crystals are formed under conditions which minimise any tendency to include pockets of mother liquor within the body of any of the crystals.

Suitably the crystals are fed to the column in a slurry which comprises aproximately one part of crystals to one of mother liquor by weight, though a portion of as little as one part of crystals to two of liquid may be treated in the present invention. If, therefore, the slurry formed by intially cooling the liquid mixture contains a low proportion of crystals, for example, a proportion of one part of crystals to five parts of liquid by weight, it is desirable to recover from this a slurry comprising a high proportion of crystals for feeding to the column. This may conveniently be achieved by feeding the slurry containing a low proportion of crystals to a decanter such as a thickener, which may be of known design, comprising a large tank with a funnelled bottom having a slight slope, an exit point at the centre of the funnelled bottom, slowly moving scrapers for moving thickened slurry to the exit point, and means for withdrawing liquid from the top of the tank; from such a thickener a slurry of higher crystal content may be withdrawn from the base, and separated mother liquor removed from the top.

If a stream of wash liquid is to be introduced from outside the column it is preferred that this should be done without causing a great deal of turbulence in the slurry being treated and this may suitably be achieved by introducing the wash liquid through inlets which may comprise a number of apertures in the column wall for a column of small diameter, or feed distributor pipes of which the open ends are disposed over the entire cross section of the column in the case of column of large diameter, which inlets are suitably situated at the bottom of the region in which the crystals fall freely. The upward flow of wash liquid should be at a sufficiently low linear rate to avoid substantial turbulence occurring in the crystals falling through the wash liquid. Suitably a rate of supply of wash liquid of at least about 1 and preferably 1½ volumes of wash liquid to every volume of crystals is provided.

In order to secure very efficient washing of the falling crystals, they may suitably be agitated, for example by the application of ultrasonic waves to the apparatus or by stirring the crystals in a horizontal plane, for example by providing in the column a central shaft carrying vertical blades movable in a horizontal plane between stationary horizontal baffles lying in the plane of the central shaft which are suitably affixed to the column wall.

The column to be used in the present invention preferably comprises a lower portion which decreases in diameter towards its lower end to provide a tapered region, as this facilitates the withdrawal of sedimented crystals from the base. The slurry to be treated is preferably fed at a position below the top of the column and the wash liquid is preferably introduced at a point above the lowest point of the column. The mixture of the mother liquor and of the upwardly flowing wash liquid is normally withdrawn at a point above that at which the slurry is introduced and suitably at the top of the column, for example by means of an overflow weir. The invention however contemplates the use of any suitable column and also the provision of an upward flow of wash liquid obtained by melting sedimented crystals whilst withdrawing liquid from the top of the column.

By providing a sufficiently high column and introducing the slurry at a point sufficiently below the top of the column, it is possible to withdraw the mixed mother liquor and wash liquid from a level at the top of the column which is free from crystals. However, if desired, liquid may be withdrawn from levels at which some crystals are present, preferably through a filter in order to prevent loss of crystals.

Preferably, however, the wash liquid comprises a higher proportion of the crystallisable component than does the mother liquor, and any other components of the wash liquid are the same as other components of the mother liquor. A suitable wash liquid may normally be provided by melting crystals withdrawn from the base of the column, and recycling part of the melted product to a suitable point in the column.

The process of the present invention is particularly appropriate to the recovery of para-xylene from mixtures comprising para-xylene and ortho-xylene, meta-xlyene and/or ethyl benzene. Suitably such mixtures contain at least 50% and preferably at least 70% of para-xylene.

One form of the invention will now be described in detail though the invention is not limited thereto.

An apparatus for carrying out the invention is shown in the accompanying figure and consists of a feedstock holding tank 1 leading to scraped surface chillers 2 (only one of which is shown) which in turn lead to a thickener 3 which comprises a tank having a slightly funnelled floor with a central exit port 4, across which floor radial arms 5 carrying scrapers are adapted to move slowly and thus to scrape any sediment from the floor of the thickener into the exit port. A weir 6 is provided at the top of the tank for the removal of mother liquor.

From the exit port 4 a line leads to a slurry inlet point 3 feet from the top of a vertical sedimentation column 7 (shown partly in section) 32 feet high of which the top 20 feet comprises a cylindrical portion 8 4 feet in diameter and the bottom 12 feet comprises a section 17 tapering to a diameter of 3 inches at its base. Four rotating shafts 9 (of which only two are visible in the drawing) run through the entire length of the cylindrical section of the tank and carry horizontal intermeshing blades 2 inches wide, lying in the plane of their shafts and spaced 12 inches apart. A common motor with reduction gearing 10 is provided to drive the shafts at 1 to 2 revolutions per minute.

From the top of the column, a pipe 11 leads back to the feedstock holding tank, and from the base of the column a conduit 12 closable by a valve 13 which is controlled by a gauge 14 sensitive to the height of a crystal bed which forms at the base of the column during the operation of the process, leads to a tank 15 for melting crystals in heat exchange with a feedstock stream. From the tank for melting crystals a line 16 leads back to a point on the column silghtly above the tapered section, and a further line from the crystal melting tank is provided for product removal.

A feedstock comprising 70% of para-xylene, the remaining 30% being mainly ortho- and meta-xylenes with a small proportion of ethyl benzene, is fed from the feedstock holding tank 1 to the scraped surface chillers 2 in which it is refrigerated to a temperature of −5° to −12° C. to provide a slurry containing from 20% to 40% by weight of solids which is fed to the thickener 3. From the base of the thickener, a slurry comprising 45% to 50% by weight of solids is withdrawn and fed to the sedimentation column 7. Crystals of the slurry are allowed to fall in the cylindrical section 8 through an upwardly flowing stream of pure para-xylene from the crystal melting tank, as wash liquid, until the crystals reach the tapered section 17 in which they become compacted to a crystal bed. In response to the gauge 14 sensitive to the height of the crystal bed, part of the compacted crystal bed is permitted to flow from the base of the column into the melt tank 15 from which approximately two thirds of the melted product is withdrawn for use as the wash liquid and approximately one-third is withdrawn as product, the exact proportions being determined according to the required purity of product, adjustments being made automatically by instruments. The mother liquor/wash liquid removed from the top of the column is recycled to the feedstock holding tank.

I claim:

1. A process for the separation from a liquid mixture of a component thereof which is crystallisable therefrom to produce crystals having a density greater than that of their mother liquor which comprises, cooling said mixture to form a slurry of crystals of the component and mother liquor, feeding said slurry to a column at a position below the top of the column, the crystals in said slurry having a density of at least 10% greater than that of the mother liquor, an average volume of at least $1 \times 10^{-5}$ cm.$^3$, with the average ratio of surface area to volume of crystals being at most $3.75/r$ where $r$ is the radius of a sphere having a volume equal to that of the average crystal, the weight ratio of crystals to mother liquor in said slurry ranging between 1:1 to 1:2, feeding a wash liquid to said column at a point above the lowest point in said column, said wash liquid being miscible with said mother liquor, the amount of wash liquid fed to said column ranging between about 1–1.5 volumes per volume of crystals fed thereto, flowing the wash liquid upwardly at a linear rate sufficiently low so as to avoid substantial turbulence in the crystals falling through said wash liquid, permitting the crystals to fall substantially freely downwardly substantially the length of said column through the upward flowing wash liquid whereby no substantial dissolution of said crystals occurs, agitating said crystals during their downward movement through said upwardly flowing wash liquid, removing a mixture of mother liquor and wash liquid from a point adjacent the top of said column and above the point at which said slurry is introduced therein, and removing crystals from the base of said column.

2. The process of claim 1 wherein the wash liquid is introduced through a number of inlets in the column wall, said inlets being at the bottom of the region in which the crystals fall freely.

3. The process of claim 1 in which para-xylene is recovered from a mixture of para-xylene with a member selected from the group consisting of o-xylene, m-xylene and ethyl benzene.

4. The process of claim 1 in which the wash liquid is introduced through feed distributor pipes of which the open ends are disposed over the entire cross-section of the column, said open ends being at the bottom of the region in which the crystals fall freely.

5. The process of claim 1 wherein the wash liquid comprises a higher proportion of the crystallisable component than does the mother liquor, any other components of the wash liquid being the same as other components of the mother liquor.

6. The process of claim 1 wherein the wash liquid is provided by melting crystals withdrawn from the base of the column.

References Cited

UNITED STATES PATENTS

| | | | |
|---|---|---|---|
| 2,813,099 | 11/1957 | Weedman. | |
| 2,823,242 | 2/1958 | McKay. | |
| 2,866,833 | 12/1958 | Spiller | 62—58 XR |
| 2,890,962 | 6/1959 | Eddy et al. | |
| 2,910,516 | 10/1959 | Rush. | |
| 3,305,320 | 2/1967 | Weech | 62—58 XR |
| 2,794,840 | 6/1957 | Vela | 62—58 |
| 2,921,968 | 1/1960 | Green | 62—58 |
| 3,067,270 | 12/1962 | Weedman | 62—58 |
| 3,411,309 | 11/1968 | Skrebowski et al. | 62—58 |

NORMAN YUDKOFF, Primary Examiner

M. G. MULLEN, Assistant Examiner

U.S. Cl. X.R.

23—273; 260—707